(12) United States Patent
Kim et al.

(10) Patent No.: US 11,274,962 B2
(45) Date of Patent: Mar. 15, 2022

(54) SYSTEMS AND METHODS FOR MULTIPHOTON DETECTION USING A CONVENTIONAL SUPERCONDUCTING NANOWIRE SINGLE PHOTON DETECTOR

(71) Applicants: Duke University, Durham, NC (US); Ohio State Innovation Foundation, Columbus, OH (US)

(72) Inventors: Jungsang Kim, Chapel Hill, NC (US); Clinton Cahall, Durham, NC (US); Daniel J. Gauthier, Hilliard, OH (US); Gregory P. Lafyatis, Grandview, OH (US); Kathryn L. Nicolich, Columbus, OH (US); Nurul T. Islam, San Jose, CA (US)

(73) Assignees: Duke University, Durham, NC (US); Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 16/189,986

(22) Filed: Nov. 13, 2018

(65) Prior Publication Data
US 2019/0145822 A1  May 16, 2019

Related U.S. Application Data

(60) Provisional application No. 62/584,202, filed on Nov. 10, 2017.

(51) Int. Cl.
*G01J 1/44* (2006.01)
*G01J 1/04* (2006.01)

(52) U.S. Cl.
CPC .............. *G01J 1/44* (2013.01); *G01J 1/0407* (2013.01); *G01J 1/0418* (2013.01); *G01J 2001/442* (2013.01)

(58) Field of Classification Search
CPC ....... G01T 1/1606; H01L 39/00; H01L 39/10; Y10S 505/00
See application file for complete search history.

(56) References Cited

U.S. PATENT DOCUMENTS

| | | | |
|---|---|---|---|
| 2011/0210235 A1* | 9/2011 | Dierickx | G01T 1/17 250/214 R |
| 2012/0140217 A1* | 6/2012 | Ozeki | G01N 21/65 356/301 |

(Continued)

OTHER PUBLICATIONS

Hofherr "Real-time imaging systems for superconducting nanowire single-photon detector arrays", Kit Scientific Publishing, Mar. 2014, p. 1-190 (Year: 2014).*

(Continued)

*Primary Examiner* — David P Porta
*Assistant Examiner* — Mamadou Faye
(74) *Attorney, Agent, or Firm* — Kaplan Breyer Schwarz, LLP

(57) ABSTRACT

An apparatus, method and system for resolving an n-number of photons from an optical source multiphoton event, the apparatus includes a cryostat includes a single-pixel superconducting nanowire single-photon detector (SNSPD) configured to receive an optical signal and therefrom produce a corresponding electrical signal, and a current bias source configured to supply a bias current to the SNSPD. The apparatus further includes a low-noise amplifier configured to produce a low-noise amplified electrical signal from the electrical signal, a signal processing circuit configured to receive the low-noise amplified electrical signal having a waveform rising edge of an n-number photon event to produce either a time-differentiated electrical signal by processing the waveform rising edge with a differentiating circuit to generate a differentiated peak corresponding to the n-number photon event, or a time-to-amplitude electrical (Continued)

signal by processing the waveform rising edge with a precision timing circuit to generate a rise time measurement corresponding to the n-number photon event. The apparatus further includes an amplitude discriminating device configured to determine an integer n-number photon event based on measuring a value of the n-number photon event.

20 Claims, 16 Drawing Sheets

(56) References Cited

U.S. PATENT DOCUMENTS

| | | | |
|---|---|---|---|
| 2013/0143744 A1* | 6/2013 | Marsili | H01L 39/10 |
| | | | 505/160 |
| 2013/0172195 A1* | 7/2013 | Bellei | G01J 5/0806 |
| | | | 505/160 |
| 2017/0350990 A1* | 12/2017 | Chmeissani Raad | G01T 1/366 |
| 2019/0190708 A1* | 6/2019 | Sibson | H04L 9/0852 |

OTHER PUBLICATIONS

Liang et al. "High-speed Single-Photon Detection with Avalanche Photodiodes in Near Infrared", Optoelectronics—Materials and Devices, Intech, 2015, p. 213-234 (Year: 2015).*

TCSPC (Year: 2005).*

Engel et al. "Detection mechanism of superconducting nanowire single-photon detectors", Zurich Open Repository and Archive, University of Zurich Main Library, 2015, p. 1-40 (Year: 2015).*

Renema et al. "Probing the Hotspot Interaction Length in NbN Nanowire Superconducting Single Photon Detectors" ArXiv, Jul. 11, 2016, p. 1-5. (Year: 2016).*

Kitaygorsky et al. "Amplitude distributions of dark counts and photon counts in NbN superconducting single-photon detectors integrated with HEMT readout", Superconductivity and its applications 532, Elsevier, 2016, p. 33-39 (Year: 2016).*

Regina Kruse et al., "Limits of the time-multiplexed photon-counting method", "Physical Review A", Feb. 8, 2017, Publisher: American Physical Society, DOI: 10 1103/PhysRevA.95.023815, vol. 95.

Jungsang Kim et al., "Multiphoton detection using visible light photon counter", "Applied Physics Letters", Feb. 15, 1999, Publisher: American Institute of Physics, pp. 902-904, vol. 74, No. 7.

Eric A. Dauler et al., "Review of superconducting nanowire single-photon detector system design options and demonstrated performance", "Optical Engineering", Aug. 1, 2014, vol. 53/Iss. 8, http://opticalengineering.spiedigitallibray.org/.

David Bitauld et al., "Nanoscale Optical Detector with Single-Photon and Multiphoton Sensitivity", "Nano Letters", Jul. 14, 2010, Publisher: American Chemical Society, DOI: 10.1021/nl10141h, pp. 2977-2981, vol. 10.

Andrew J. Kerman et al., "Electrothermal feedback in superconducting nanowire single-photon detectors", "Physical Review", Mar. 26, 2009, Publisher: The American Physical Society, DOI: 10.1103/PhysRevB.79.100509.

* cited by examiner $$L_k \frac{dI_{det}}{dt} = -(nR_{hs} + R_L)I_{det} + I_L R_L$$

$$\frac{dR_{hs}}{dt} = \frac{2R_{sq}v_0}{w} \frac{\psi(I_{det}/I_c)^2 - 2}{\sqrt{\psi(I_{det}/I_c)^2 - 1}}$$

$$nR_{hs} \sim \sqrt{n}$$

SYSTEMS AND METHODS FOR MULTIPHOTON DETECTION USING A CONVENTIONAL SUPERCONDUCTING NANOWIRE SINGLE PHOTON DETECTOR

RELATED APPLICATION INFORMATION

This application is based on U.S. Provisional Application Ser. No. 62/584,202 filed on Nov. 10, 2017, the subject matter thereof hereby incorporated by reference.

BACKGROUND

Photon-number resolution is useful for many practical applications including Bell state measurements, source characterization, and quantum communication.

Photon-number resolution is traditionally achieved using detectors designed with inherent number resolving power—such as the Transition Edge Sensors (TES), (see FIG. 1), or Visible Light Photon Counters (VLPC), (see FIG. 2), where the height of the electrical signal is proportional to the number of detected photons. However, each of these schemes have significant drawbacks—such as limited count rate in TES being approximately 1 Mcps, or high Dark Count Rate (DCR), (approximately 1 kcps), in VLPC.

There also exists pixel array detectors that have several active areas for multi-photon absorption, but these schemes also suffer from an increase in system complexity.

Conventional single-pixel superconducting nanowire single-photon detectors (SNSPDs) are used widely in quantum information and quantum optics experiments because of their near unity detection efficiency, high photon saturation rate, and low timing jitter. Typically, they operate in Geiger-mode, where a threshold is applied to the electrical signal generated by the read-out circuit indicating the detection of at least one photon. However, there are many experiments where it is highly desirable or even necessary to use detectors that resolve the photon number n.

To address this issue, several groups have devised ways to use Geiger-mode SNSPDs to emulate photon-number-resolving detectors, including: spreading the wave-packet across a detector array; temporal multiplexing; and operating the detector with a low bias so that only multi-photon events are recorded. While these approaches are adequate for some applications, they often lead to complex systems or non-ideal behaviors. Other devices, including visible-light photon counters or transition-edge sensors, have degraded metrics, such as higher dark count rates or slower response time, among others.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, an apparatus that resolves an n-number of photons from an optical source multiphoton event, includes a cryostat configured to operate at approximately 15-degrees Kelvin or below including a single-pixel superconducting nanowire single-photon detector (SNSPD) configured to receive an optical signal and therefrom produce a corresponding electrical signal, and a current bias source configured to supply a bias current to the SNSPD.

The apparatus further includes a low-noise amplifier configured to receive the electrical signal and therefrom produce a low-noise amplified electrical signal.

The apparatus further includes a signal processing circuit configured to receive the low-noise amplified electrical signal having a waveform rising edge of an n-number photon event to produce either a time-differentiated electrical signal by processing the waveform rising edge with a differentiating circuit to generate a differentiated peak corresponding to the n-number photon event, or a time-to-amplitude electrical signal by processing the waveform rising edge with a precision timing circuit to generate a rise time measurement corresponding to the n-number photon event.

The apparatus further includes an amplitude discriminating device configured to determine an integer n-number photon event based on measuring a value of the n-number photon event.

In another embodiment disclosed herein, a method resolves a discrete number of photons from an optical source multiphoton event includes providing a cryostat includes a single-pixel superconducting nanowire single-photon detector (SNSPD) receiving an optical signal and therefrom producing a corresponding electrical signal. and a current bias source configured to supply a bias current to the SNSPD.

The method further includes providing a low-noise amplifier receiving the electrical signal and therefrom producing a low-noise amplified electrical signal.

The method further includes providing a signal processing circuit configured to receive the low-noise amplified electrical signal having a waveform rising edge of an n-number photon event to produce either a time-differentiated electrical signal by processing the waveform rising edge with a differentiating circuit to generate a differentiated peak corresponding to the n-number photon event, or a time-to-amplitude electrical signal by processing the waveform rising edge with a precision timing circuit to generate a rise time measurement corresponding to the n-number photon event.

The method further includes providing an amplitude discriminating device configured to determine an integer n-number photon event based on measuring a value of the n-number photon event.

In another embodiment disclosed herein, a system resolves an n-number of photons from an optical source multiphoton event, the system including an apparatus having a cryostat comprising therein a single-pixel superconducting nanowire single-photon detector (SNSPD), and a current bias source. The apparatus further including a low-noise amplifier, a signal processing circuit and an amplitude discriminating device.

The system further includes a method of resolving the n-number of photons from the optical source multiphoton event by operating the cryostat at or below 4-degrees Kelvin, receiving an optical signal at the SNSPD to produce a corresponding electrical signal, supplying, by the current bias source, a bias current to the SNSPD, amplifying, by the low-noise amplifier, the electrical signal to produce a low-noise amplified electrical signal.

The system further includes the method of producing, by the signal processing circuit, a waveform rising edge of an n-number photon event to produce either a time-differentiated electrical signal by processing the waveform rising edge with a differentiating circuit to generate a differentiated peak corresponding to the n-number photon event, or a time-to-amplitude electrical signal by processing the waveform rising edge with a precision timing circuit to generate a rise time measurement corresponding to the n-number photon event.

The system further includes the method of determining, by the amplitude discriminating device, an integer n-number photon event based on measuring a value of the n-number photon event.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

Figure 1:
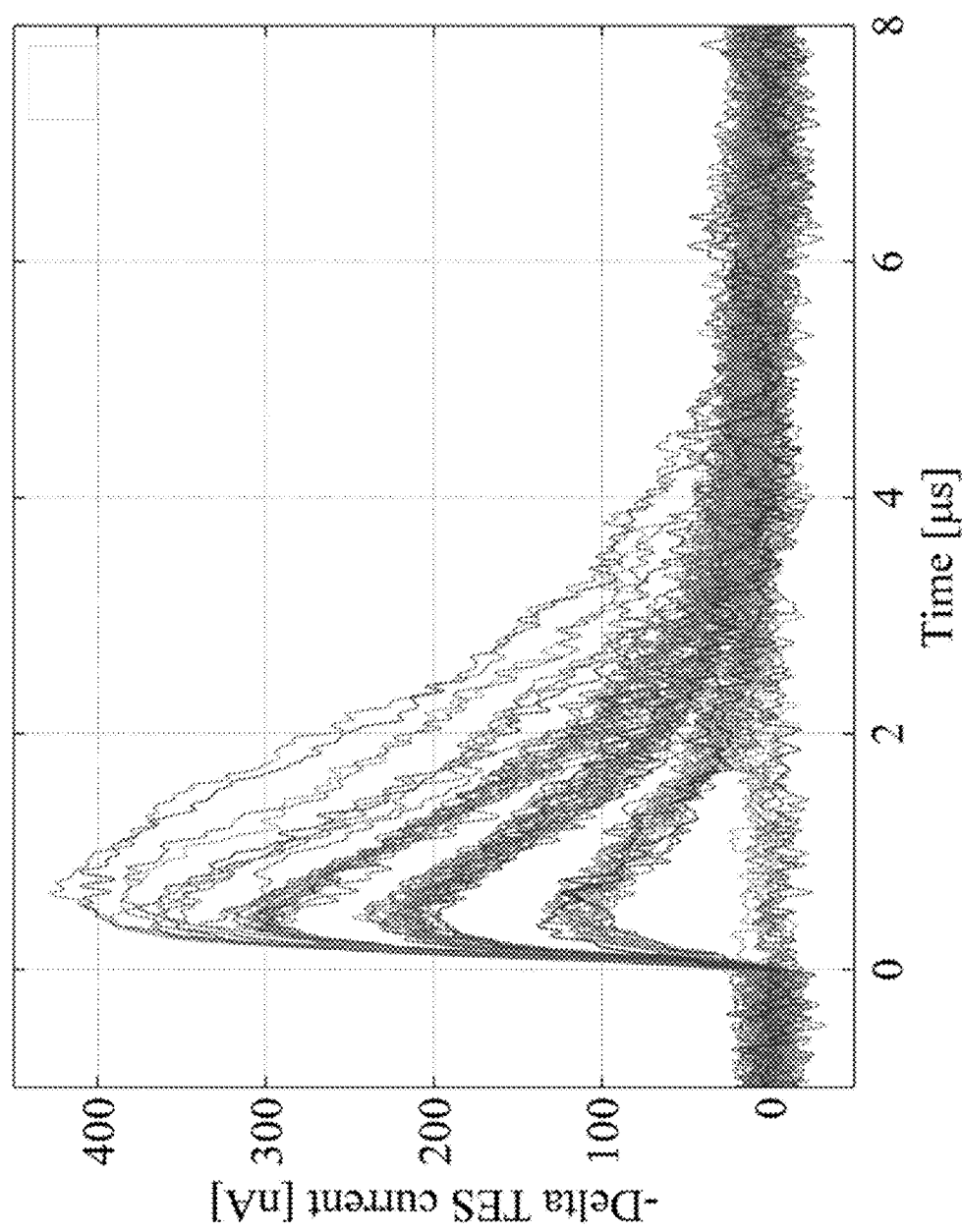
FIG. 1 illustrates a prior art Transition Edge Sensor (TES)
Figure 2:
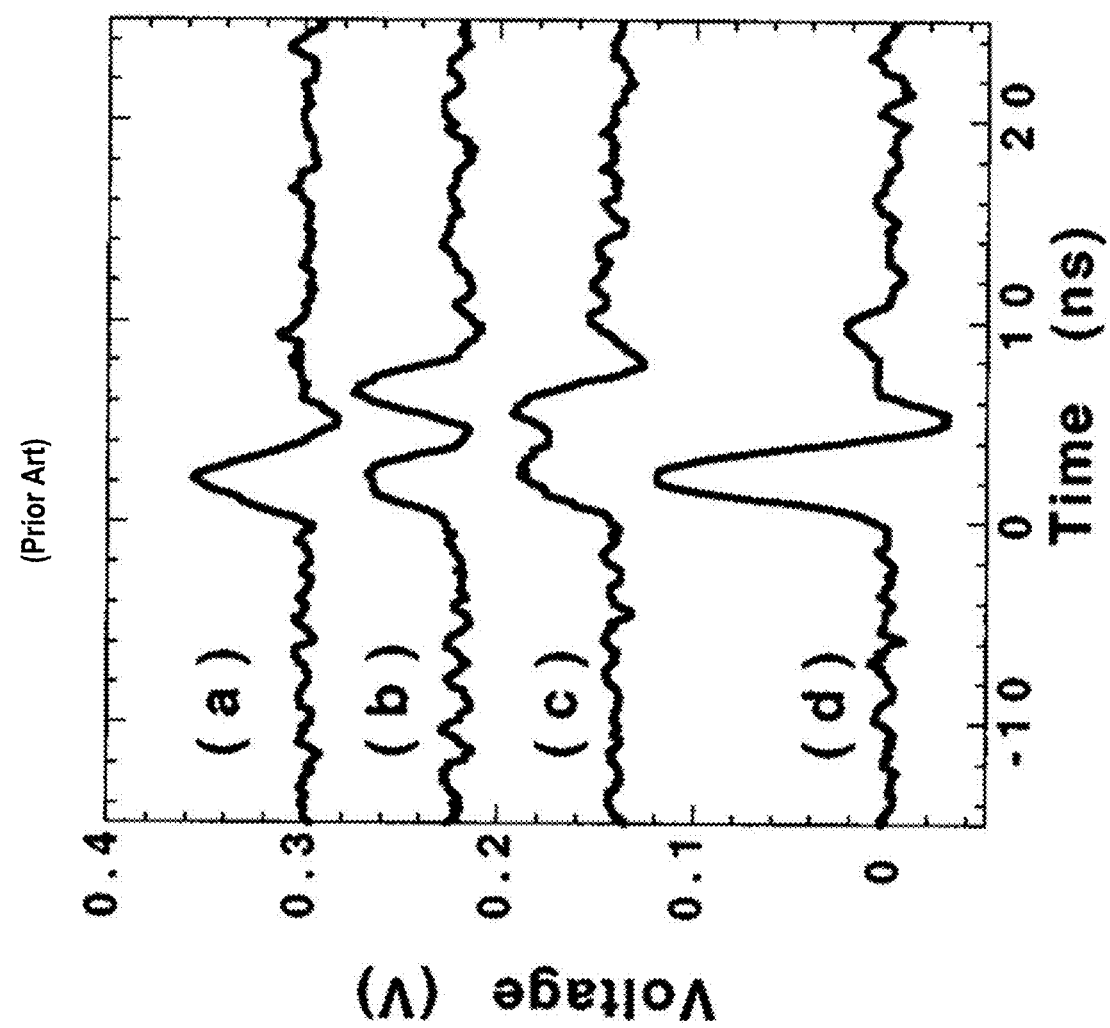
FIG. 2 illustrates a prior art Visible Light Photon Counters (VLPC)
Figure 3:
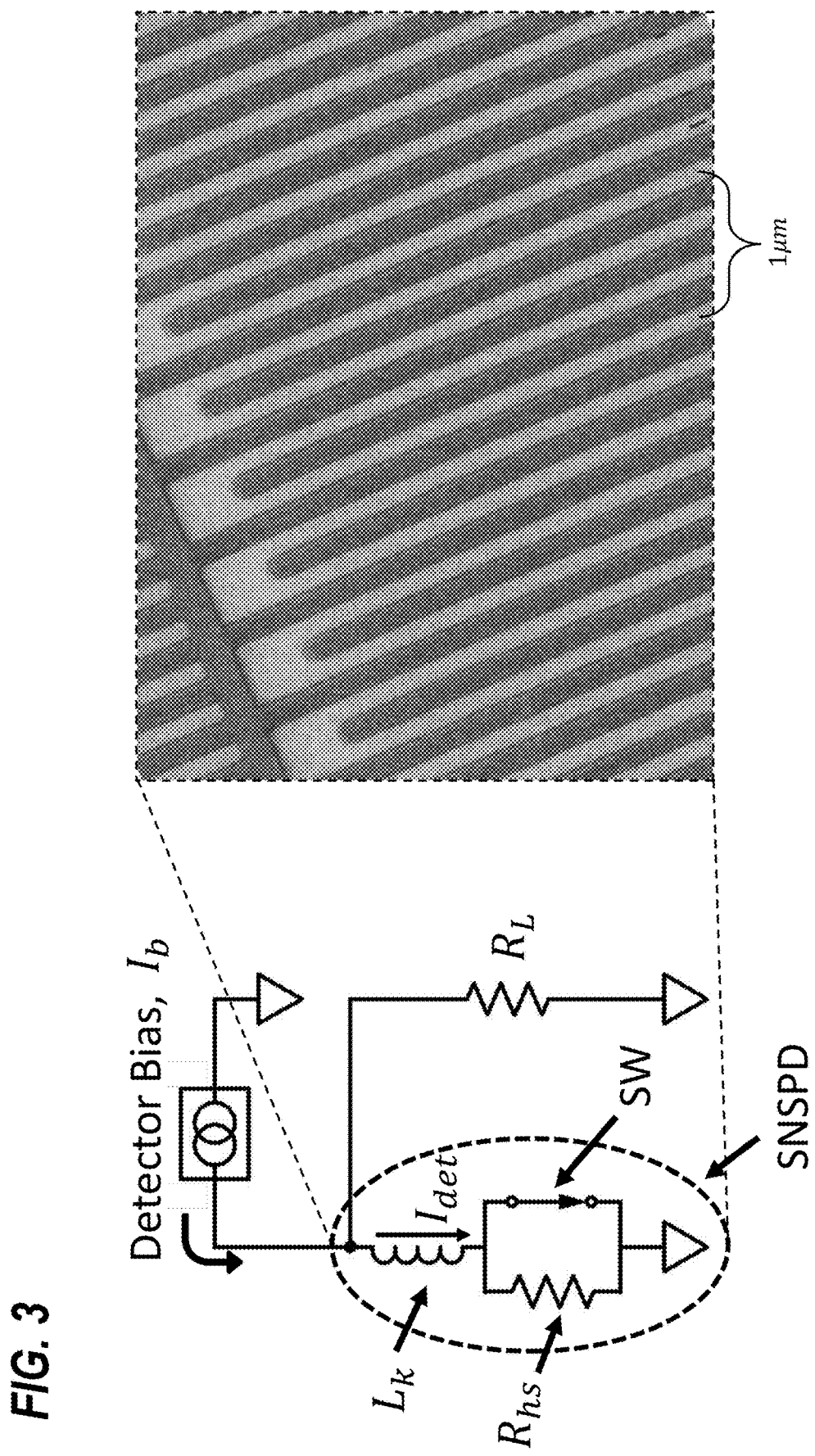
FIG. 3 illustrates a schematic equivalent circuit diagram on the left of an SNSPD and a scanning electron micrograph image of a nanowire SNSPD on the right.

The present disclosure provides, in part, systems and methods for multi-photon detection using a conventional superconducting nanowire single-photon detector (SNSPD) apparatus. In some embodiments, the systems and methods provided herein show number resolution up to four photons with probability distribution peak heights that are consistent with Poisson statistics appropriate for the weak coherent source. SNSPDs have outstanding performance demonstrated by their high efficiency, low dark counts, great timing and high-count rates. FIG. 3 illustrates a schematic equivalent circuit diagram on the left of an SNSPD and a scanning electron micrograph image of a nanowire SNSPD on the right.

Key characteristics of SNSPD operation are as follows. To zeroth order, the detector is modeled as a resistor $R_{hs}$ with a bypass switch SW and a series inductor $I_{det}$ representing the kinetic inductance $L_k$ of the device and they are biased with a constant detector bias current $I_b$. In parallel with the SNSPD detector is a load resistor $R_L$.

Figure 4:
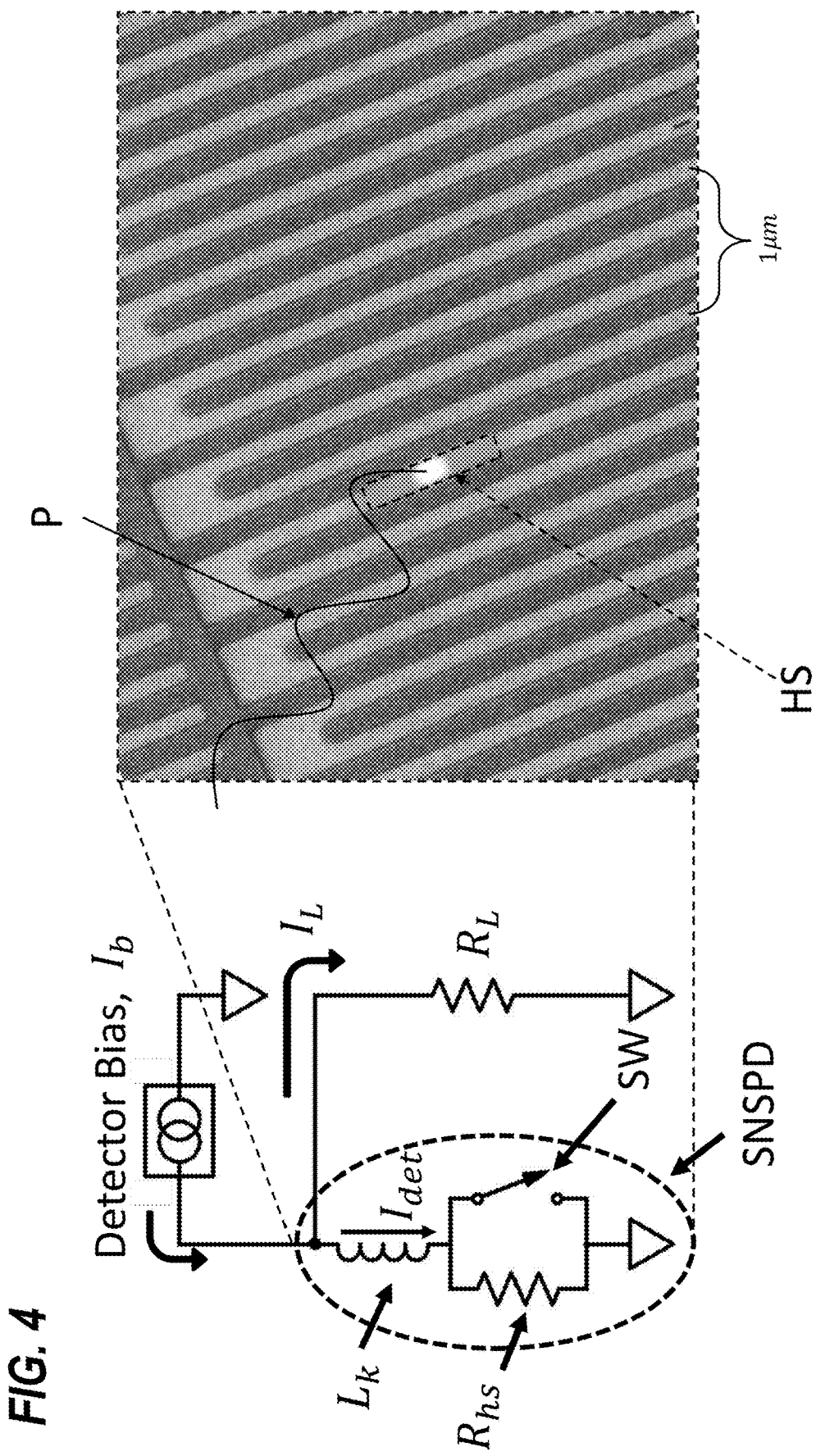
FIG. 4 illustrates an instance a photon P being absorbed in the SNSPD and creating a resistive hot-spot (HS)

FIG. 4 illustrates the instance a photon P is absorbed in the SNSPD it creates a resistive hot-spot (HS), represented by the resistor $R_{hs}$. Upon absorption, the switch SW opens and $I_{det}$ is decreased and bias current $I_b$ is diverted out of the detector and in to the load resistor $R_L$—usually the input of an amplifier.

Figure 5:
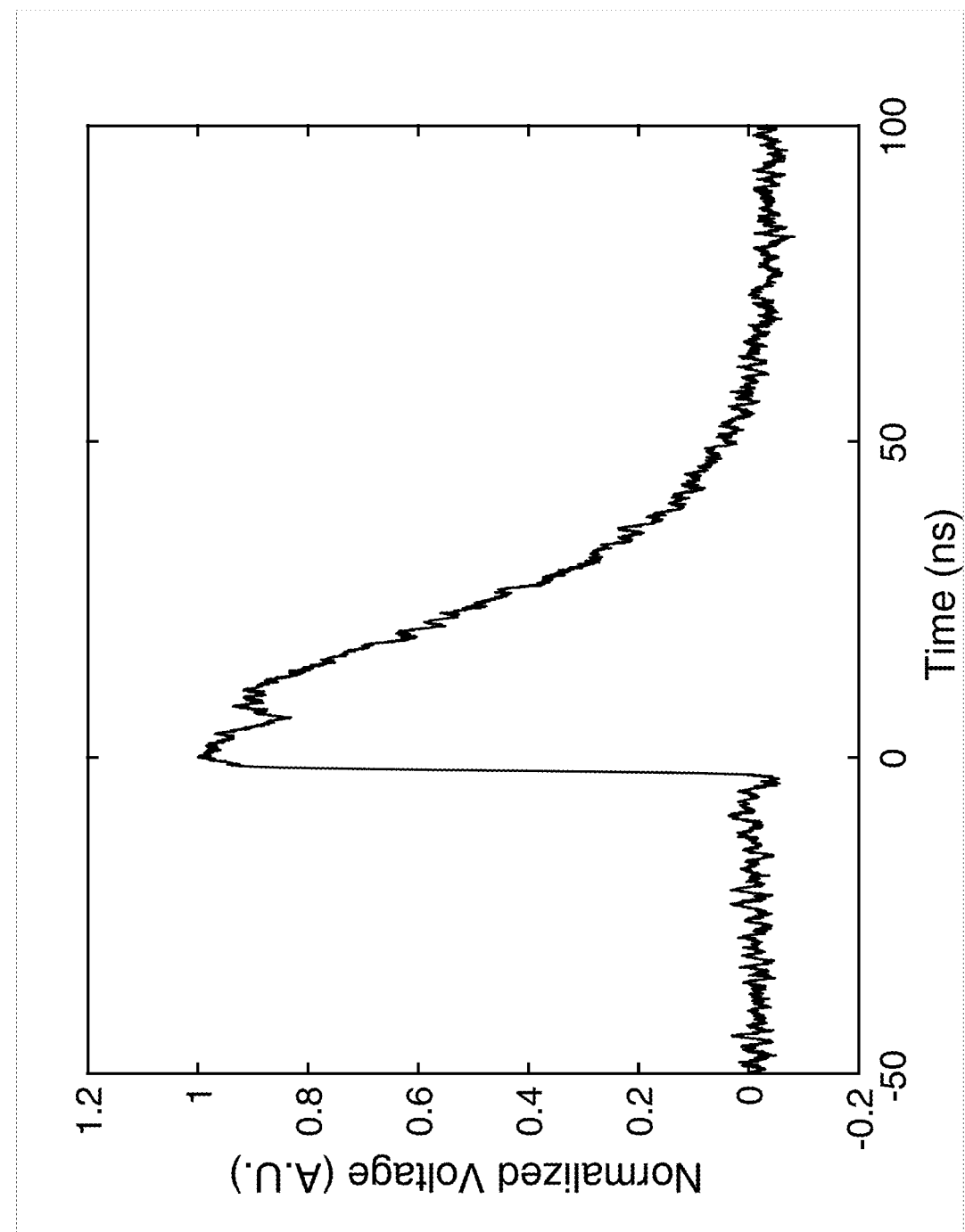
FIG. 5 illustrates a plot of normalized voltage verses time of the resistive hot-spot event at the SNSPD.

FIG. 5 illustrates a plot of normalized voltage verses time of the resistive hot-spot event at the SNSPD. The waveform has a sharp rising edge and a slower decay back to zero. The time-scale of the rising edge of the pulse is given by $L_k/R_{hs}$. Additionally, the existing electrothermal models for device operation show that the stagnated hotspot HS on the SNSPD is very small in size compared to the overall length of the nanowire.

Figure 6:
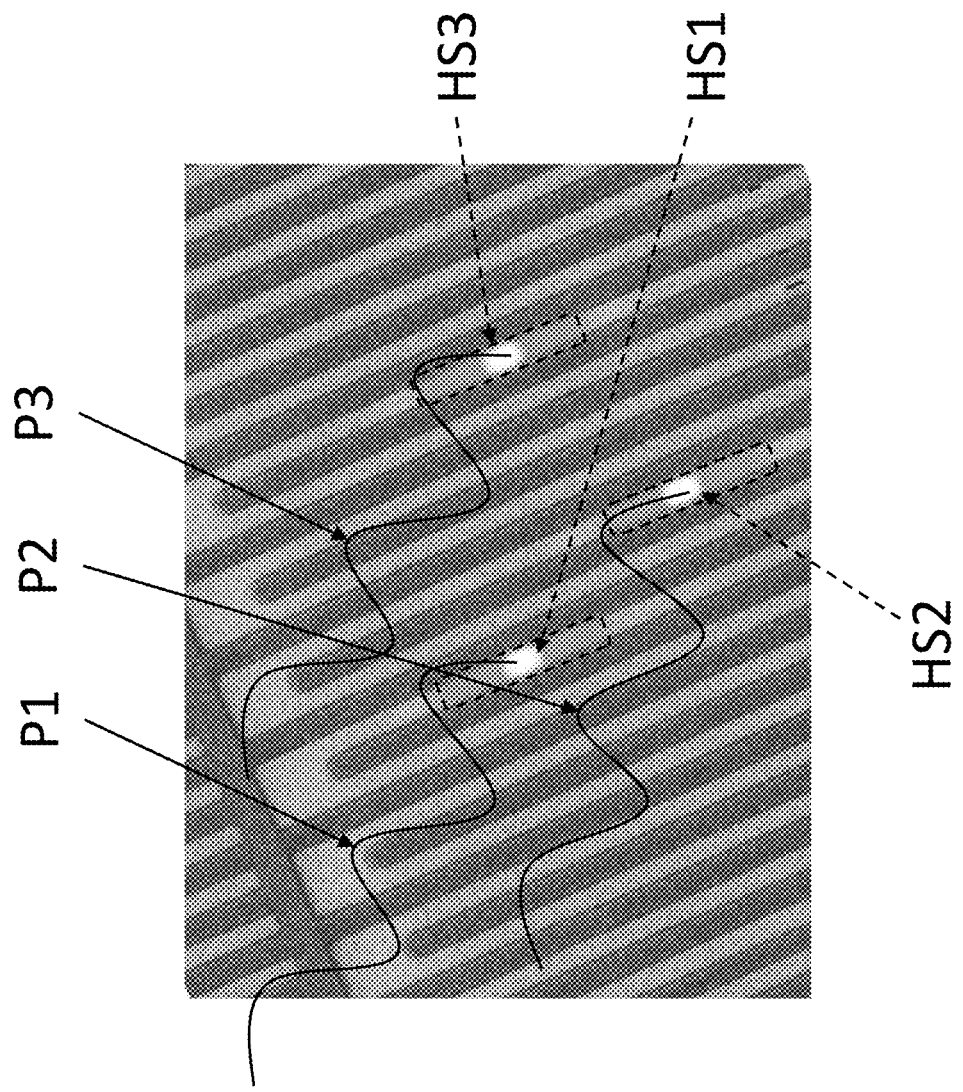
FIG. 6 illustrates a scanning electron micrograph image of a nanowire SNSPD demonstrating multiple individual corresponding hotspots being absorbed in different sections of the nanowire.

Due to the fact that the hot-spot is relatively localized in the detector, this leaves open the opportunity for multiple photons (P1, P2, P3), see FIG. 6, to be absorbed in different sections of the nanowire. Multiple individual corresponding hotspots (H1, H2, H3) will lead to an overall increase in the resistance of the detector during absorption—which in turn which will produce a change in the waveform rise-time.

Figure 7:
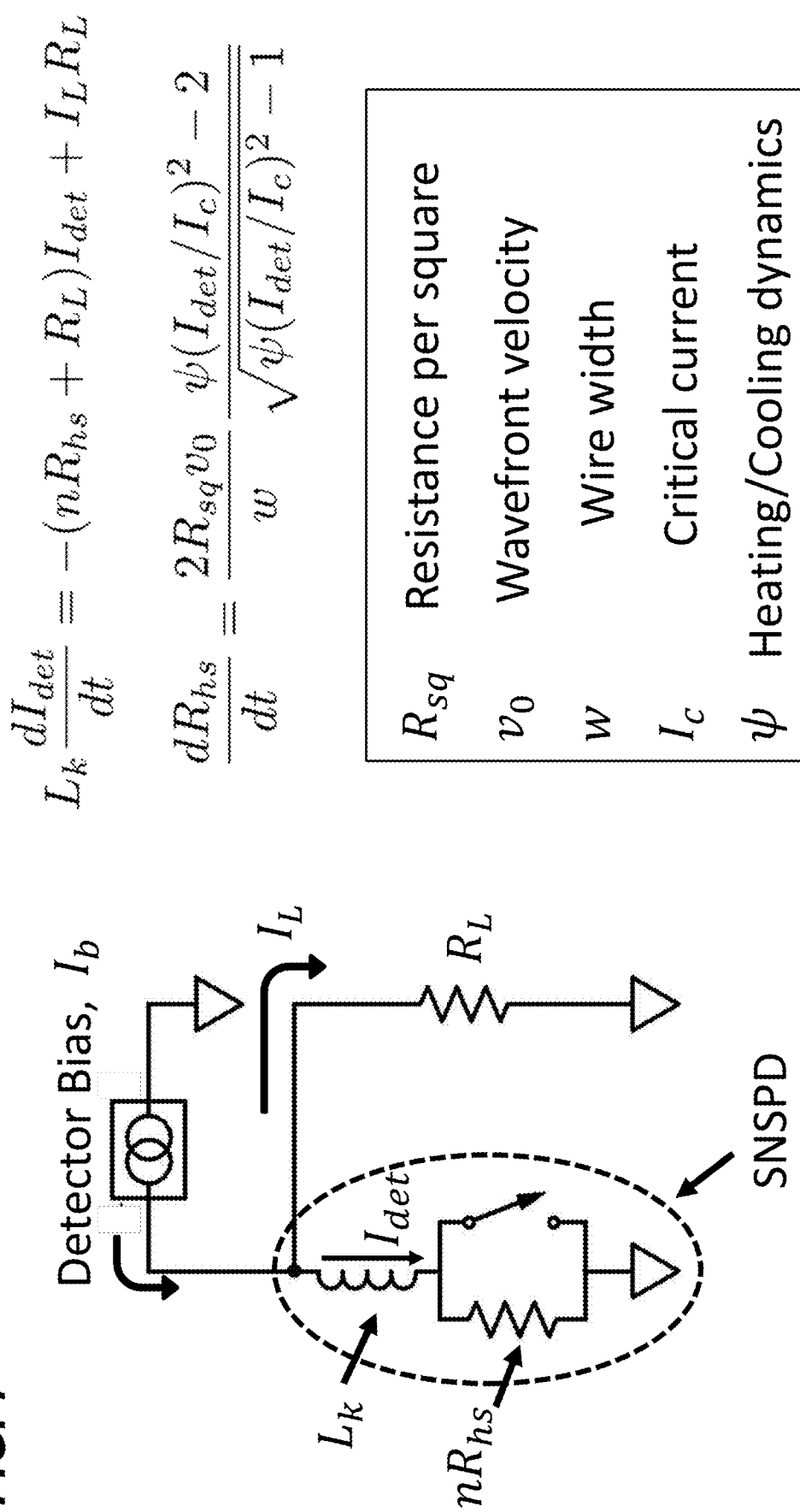
FIG. 7 illustrates the generalized electrothermal model allowing for n-hotspots.

FIG. 7 illustrates the generalized electrothermal model developed by Kerman, et al., (Physical review B 79.10 (2009)), to allow for n-hotspots. The device dynamics described in this model are governed by the two coupled differential equations (A) and (B). The top equation (A) describes the circuit dynamics of the system and describes the changes in the current through the detector due to the value of $nR_{hs}$. This is essentially Kirchoff's conservation law.

The second equation (B) is a thermal equation that describes the growth of an individual hotspot. The heating and cooling dynamics that control this are captured in the second term psi ($\psi$)—which is known as the Stekley parameter. The first term contains material and geometrical constants—$R_{sq}$ is square resistance, $v_0$ is hotspot velocity, and w is wire width.

Figure 8:
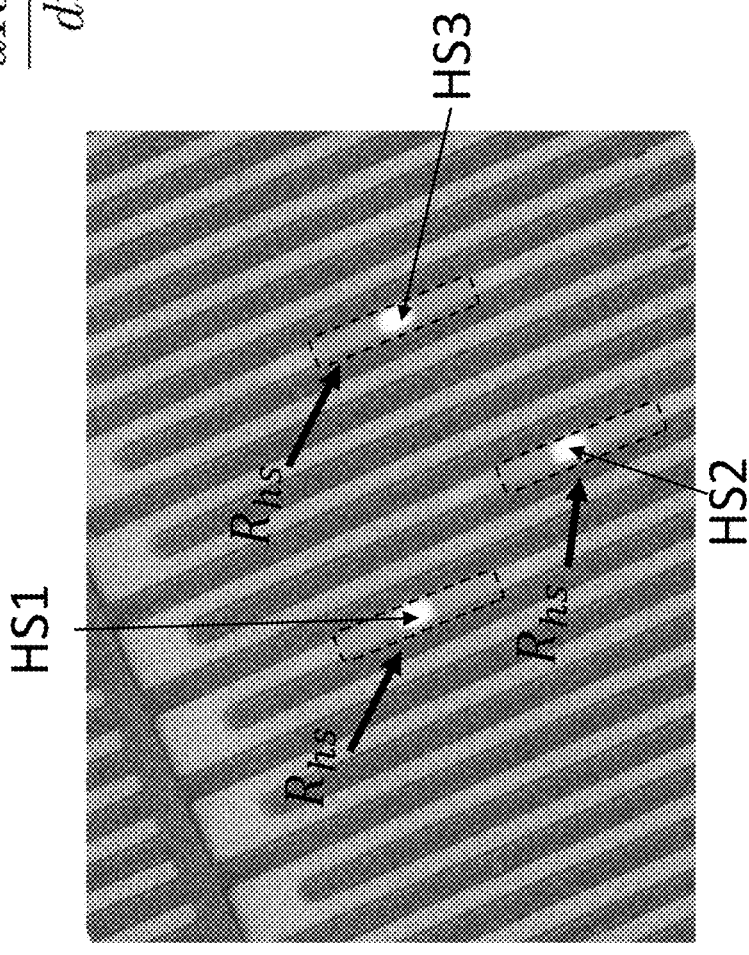
FIG. 8 further illustrates the generalized model allowing for the formation of n hotspots of FIG. 7.

FIG. 8 illustrates the generalized model allowing for the formation of n hotspots. Assuming that the hotspots do not overlap, the equations are solved and the detector's response is predicted. The main result born from this analysis is that the resistance of each hotspot depends on n—and the total resistance $n-R_{hs}$ goes as the square root of (n). This is because the current flowing through the detector and the value of the hot-spot resistance are highly dependent on each other.

Figure 9:
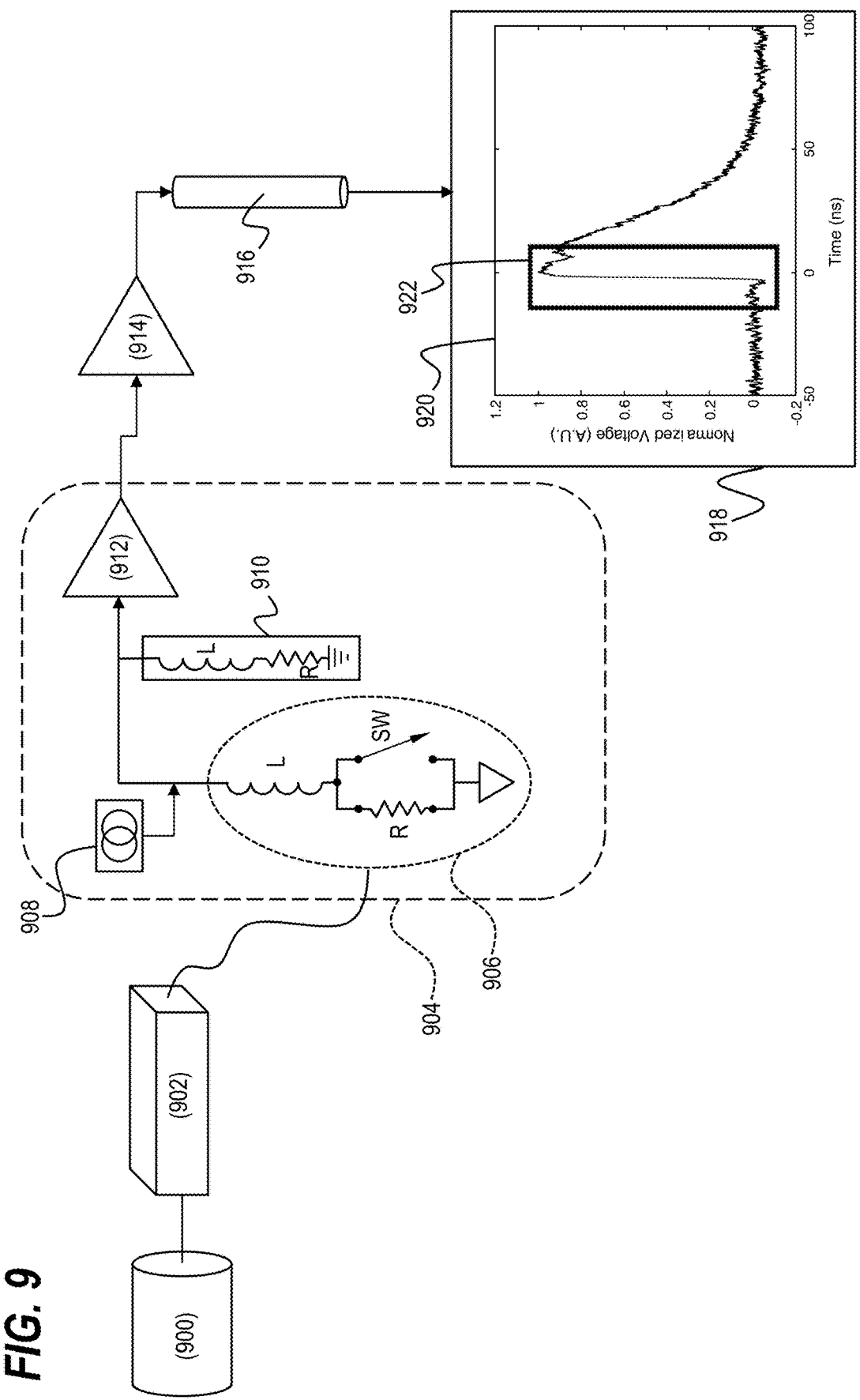
FIG. 9 illustrates schematic diagram of an apparatus and an output waveform.

FIG. 9 illustrates schematic diagram of the apparatus used to test our predictions. We use an optical source of an intensity-modulated 1550 nm Continuous-Wave (CW) laser 900 with an 80-picosecond pulse width and a 300 kHz pulse repetition rate. An inline variable attenuator 902 may be used to control the mean photon number per emitted pulse width.

A cryostat 904 operating at approximately 800 millidegrees Kelvin may contain at least the following components:
  a single-pixel amorphous SNSPD detector 906;
  a detector bias circuit 908 that supplies a current load $I_b$ to the SNSPD as previously described;
  an L-R 910 filter; and
  a wideband cryogenic amplifier 912 that amplify the electrical waveforms generated by the SNSPD detector 906.

High bandwidth and a high signal-to-noise ratio are advantageous to resolve changes in waveform slope that later are on the order of approximately 100-picoseconds. As a result, a DC path to ground, shown here with the L-R 910 filter, eliminates non-linear effects from AC coupled readout amps operating at high rates. The addition of the L-R filter 910 allows the operation at the pulse repetition rate of our laser CW source 900. The L-R filter 910 is inserted before the cryogenic amplifier and may consist of a 24-ohm resistor and a 220-nanohenries inductance being advantageous to allow the detector to operate at the count rates required for measurement while preserving the fast-rising edge. The L-R filter 910 improves the quality of data by increasing the signal to noise ratio (SNR).

The electrical readout of the SNSPD output signal consists of a wideband cryogenic amplifier 912 (e.g., CITLF3 from Cosmic Microwave Tech) that allows a signal-to-noise ratio of approximately 200:1 coupled to the L-R filter 910. The wideband cryogenic amplifier 912 comprises rise time of approximately 500-picoseconds, a noise temperature of approximately 4-degrees Kelvin, a bandwidth of approximately 2.5 GHz, and a gain of approximately 30-dB. All of these metrics measure the information that is encoded in the rising edge of the waveform. A wide bandwidth is advantageous to preserve the true rising edge without being slowed from bandwidth limitations and a small noise temperature decreases the random variation introduced in to the signal. A high gain is advantageous to boost the signal well above the noise floor of a measurement device 918, (e.g., an oscilloscope, e.g., Agilent Infiium 80404B, 8 GHz analog bandwidth, at 40 Gsamples/second). The measurement device 918 may further include an amplitude discriminating device configured to measure a peak amplitude of a processed signal isolating the waveform rising edge of the electrical readout of the SNSPD output signal representing an n-photon number event.

The signal is further amplified by a commercial low-noise room-temperature amplifier 914, (e.g., Mini-Circuits ZFL-1000LN). This low-noise amplifier 914 may have a specified bandwidth of 1 GHz or a generally equivalent 3-dB roll-off close to 2 GHz being advantageous to have minimal effects on the waveform rising edge.

A room temperature double-shielded coaxial cable 916 (e.g., RG142 from Pasternack) is advantageous to support an 8 GHz maximum frequency that feeds the output signal to the measurement device 918. The waveform graph 920 of normalized voltage output at this point verses time includes a steep rise (outlined by rectangular box 922) at the occurrence of an event having an absorbed photon on the SNSPD. Recall that we expect the number of absorbed photons to affect the rise-time of the waveform.

Figure 10:
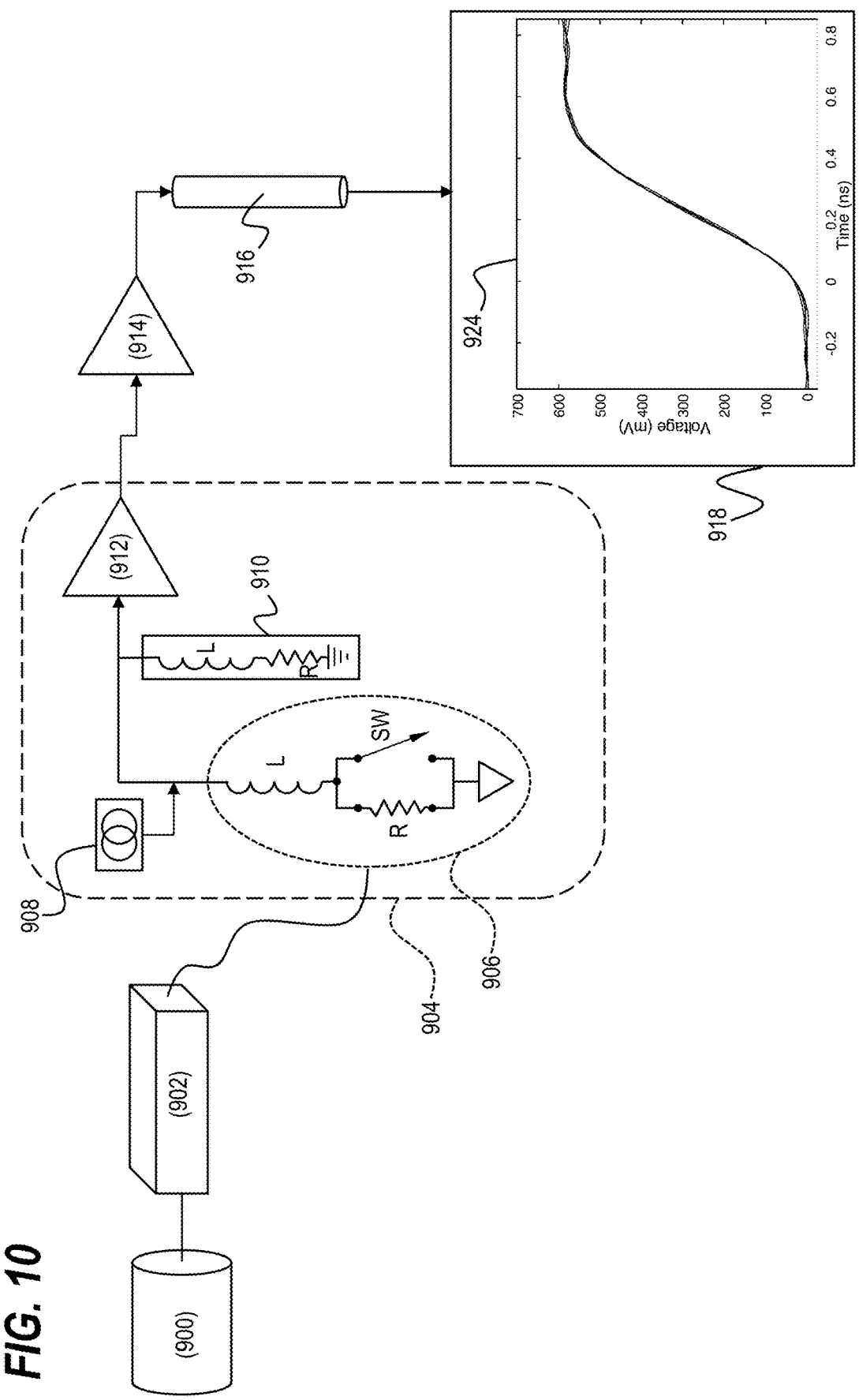
FIG. 10 illustrates the schematic diagram of the apparatus of FIG. 9 and a zoomed-in portion of the output waveform of FIG. 9.

FIG. 10 illustrates the same waveform graph 920 of FIG. 9 providing a zoomed waveform graph 924 corresponding to the rising edge of the waveform 920 in rectangular box 922 to look for changes in the waveform slope. Graphs 920, 924 and 926 illustrates a number of single-shot waveforms when viewing the output of the amplifier 914 on the measurement device 918.

Figure 11:
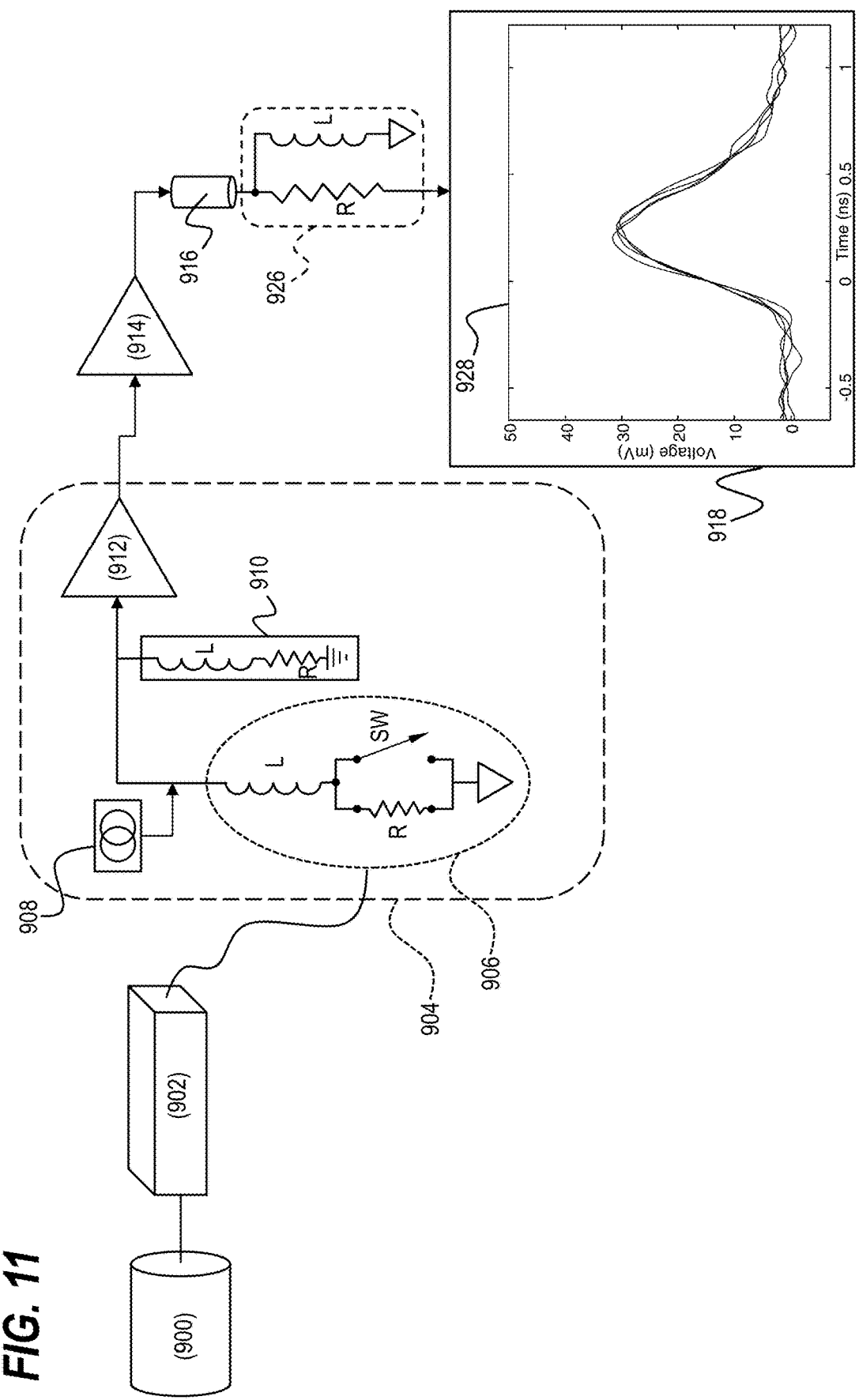
FIG. 11 illustrates the schematic diagram of the apparatus of FIG. 9 and a differentiated output waveform of FIG. 10.

FIG. 11 illustrates the effect of signal processing circuit 926 that isolates a waveform rising edge of an n-number photon event. For in one embodiment, the signal processing circuit 926 may include a differentiating circuit, illustrated as including a resistor R and an inductive load L, that converts the steepness or slope of the isolated waveform rise-time to a peak voltage value (illustrated as a time-differentiated electrical signal 928) corresponding to the n-number photon event).

In an alternative embodiment, (not illustrated), the signal processing circuit 926 may alternatively include a precision timing circuit that converts the steepness or slope of the isolated waveform rise-time to a rise time measurement corresponding to the n-number photon event.

Graph 928 illustrates the same number of single-shot differentiated waveforms illustrated in the corresponding graph 924 of FIG. 10. When the waveform slope changes, it is easier to discriminate between these changes using conventional thresholding techniques with a differentiated waveform. Note each discrete line of graphs 920, 924 and 928 represent a single event photon waveform.

Figure 12A:
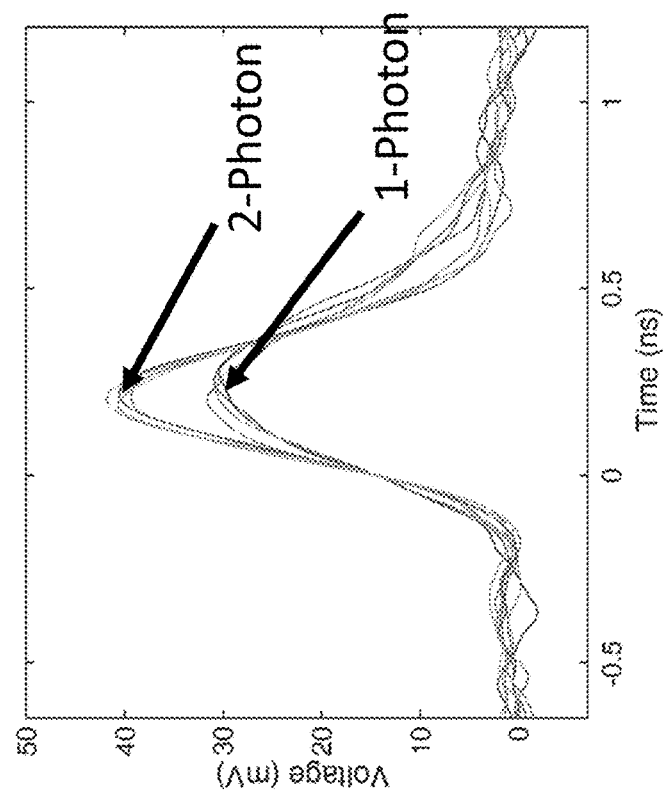
FIG. 12A illustrates a non-differentiated pulse showing the 1-photon waveform rising edge compared to a 2-photon waveform rising edge.

When two photons are absorbed the rising edge is steeper, and the differentiated pulse has a larger peak. FIG. 12A illustrates the non-differentiated pulse showing the 1-photon waveform rising edge compared to a 2-photon waveform rising edge.

Figure 12B:
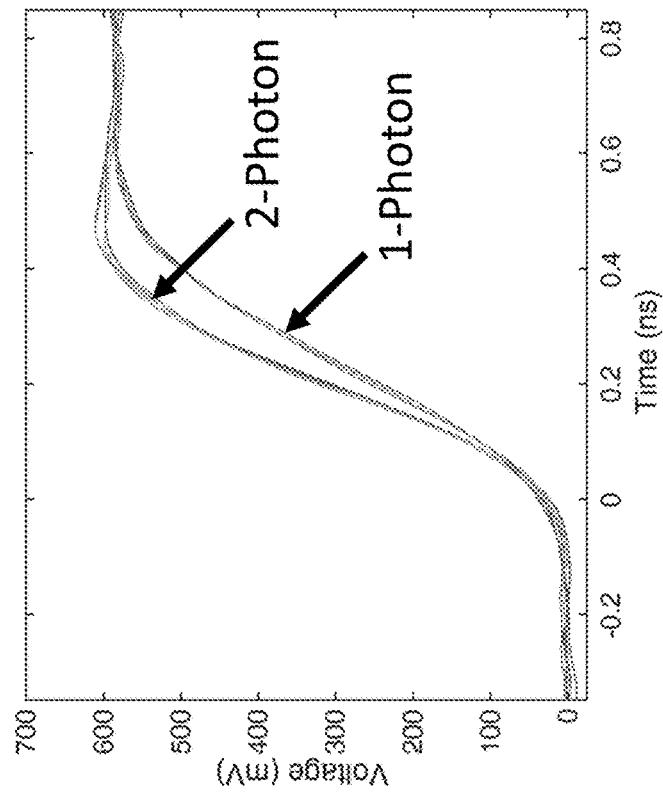
FIG. 12B illustrates the pulse peak showing the 1-photon differentiated waveform rising edge compared to the pulse peak of the 2-photon differentiated waveform rising edge of FIG. 12A.

FIG. 12B illustrates the pulse peak showing the 1-photon differentiated waveform rising edge compared to the pulse peak of the 2-photon differentiated waveform rising edge.

Figure 13A:
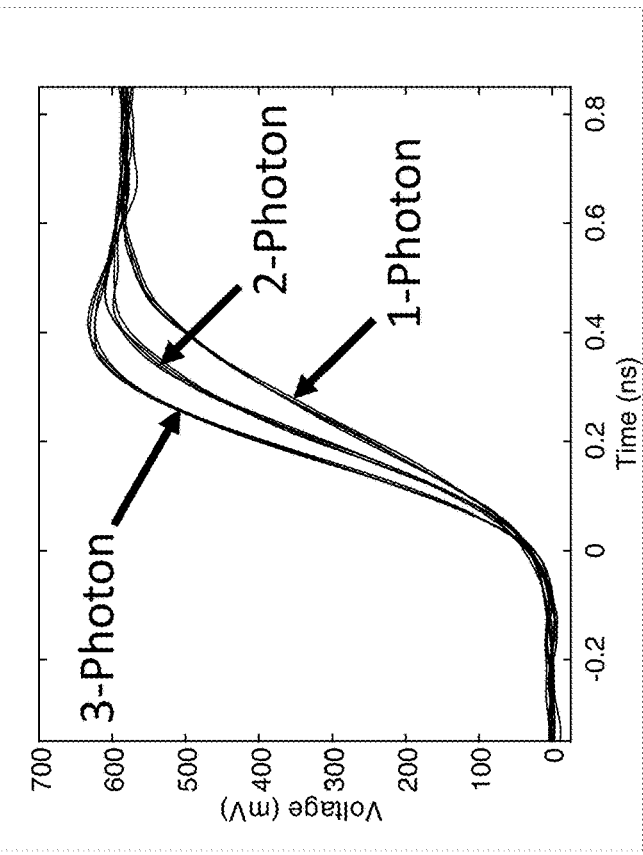
FIG. 13A illustrates the non-differentiated pulse showing the 3-photon waveform rising edge compared to the 1-photon and 2-photon waveform rising edges.
Figure 13B:
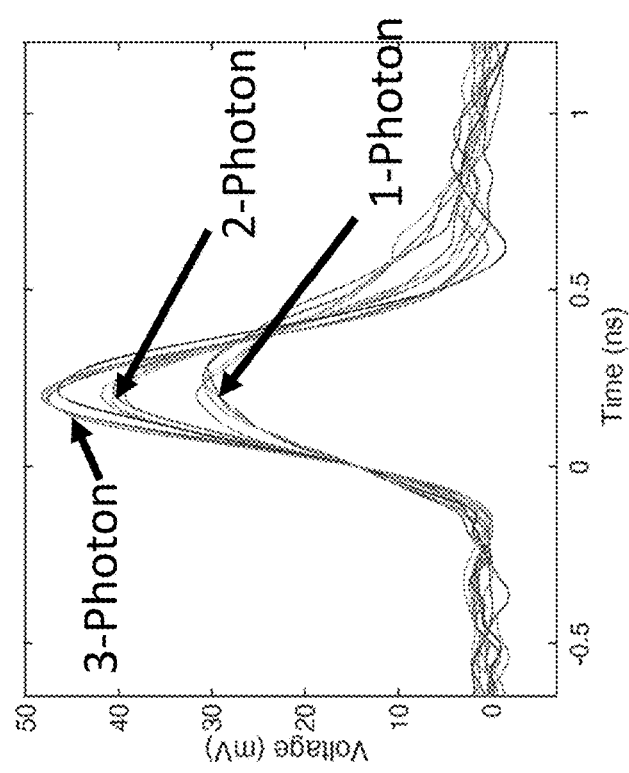
FIG. 13B illustrates the pulse peak showing the 3-photon differentiated waveform rising edge compared to the pulse peaks of the 1-photon and 2-photon differentiated waveform rising edges of FIG. 13A.

FIG. 13A illustrates the non-differentiated pulse showing the 3-photon waveform rising edge compared to the 1-photon and 2-photon waveform rising edges. FIG. 13B illustrates the pulse peak showing the 3-photon differentiated waveform rising edge compared to the pulse peaks of the 1-photon and 2-photon differentiated waveform rising edges. The steepness of the rising edge further increases, as well as the differentiated peak height, for 3-photon absorption. Also, notice the decrease in the peak height difference between 2 and 3 photons compared to 1 and 2. This is due to the square root of n dependence in the hotspot resistance, as well as bandwidth limiting effects from the electrical readout.

To further confirm that we are measuring multi-photon events we collect millions of these differentiated waveforms and construct a histogram of the peak voltage values for different mean photon numbers per optical pulse.

Figure 14:
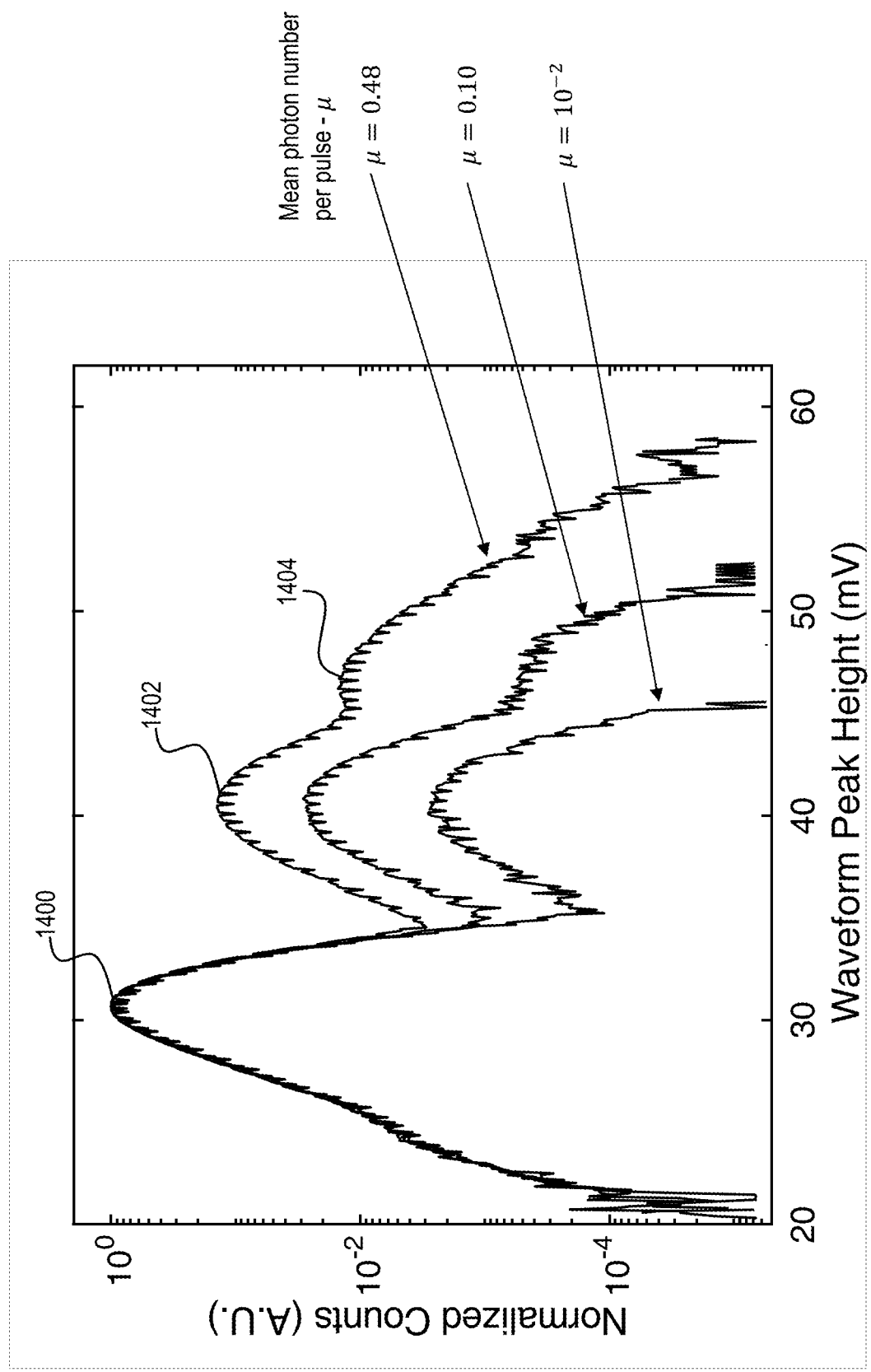
FIG. 14 illustrates the histograms for three different calibrated mean photon numbers, given by mu ($\mu$)

FIG. 14 illustrates the histograms for three different calibrated mean photon numbers, given by mu (μ). The x-axis is the value of the maximum peak height of the differentiated pulse—so moving left to right are smaller to larger waveforms. And the counts are plotted on a log scale. The main peak 1400 centered at 30 mV is the single photon peak. The peak 1402 at ~40 mV is 2-photon, and further to the right peak 1404 is 3-photon and four to the right of that.

The calibration of mu for each measurement is performed by comparing the measured count rate to the repetition rate of the source and correcting for a statistical distribution of photons. As the mean photon number is increased, more multi-photon events are recorded and are shown at the higher voltage values.

Figure 15:
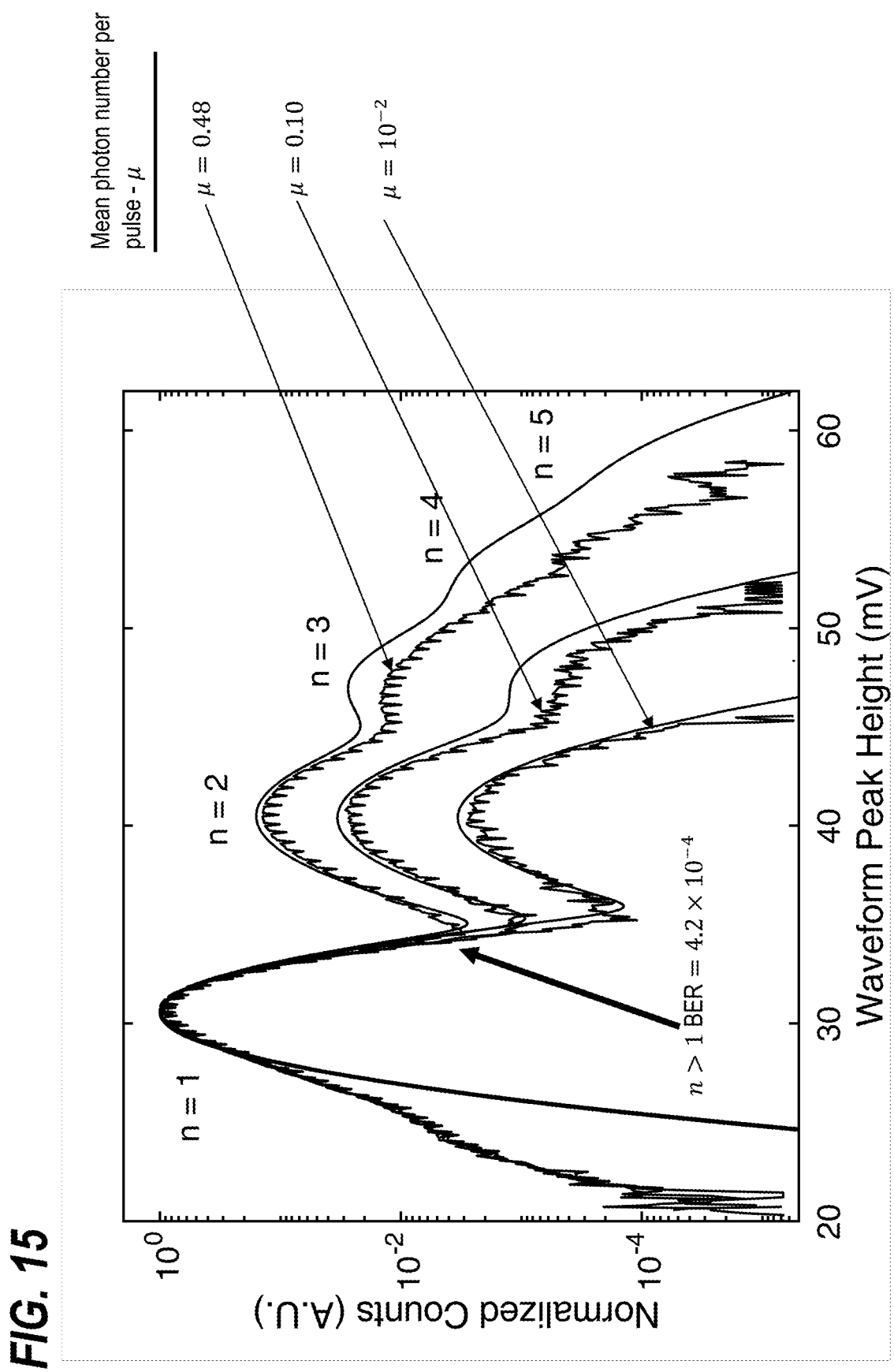
FIG. 15 illustrates the histograms for three different calibrated mean photon numbers, given by mu ($\mu$) of FIG. 14 further illustrating solid lines show a fit to the data using sums of gaussian functions.

FIG. 15 illustrates the histograms for three different calibrated mean photon numbers, given by mu (μ), where the solid lines show a fit to the data using sums of gaussian functions, where the center and width of the gaussians are free parameters with the constraint that the integral under the curve follow a Poisson distribution for the calibrated mean photon number. The discrepancy between the measured counts and expected counts at the higher photon numbers may be due to the finite width of the given optical pulse— which could affect the absorption of larger numbers of photons. However, we show a Bit Error Rate (BER) between n=1 and n>1 photon absorption to be 4.2e-4.

Note the center of each distribution gets closer and closer for higher values of n—again consistent the model and amplifier bandwidth effects.

In summary of FIGS. 9-11, an apparatus that resolves an n-number of photons from an optical source multiphoton event may include an intensity modulated continuous wave (CW) optical source generating an optical signal includes a series of optical wave-packets and a variable optic attenuator configured to receive the optical signal and therefrom produce an attenuated optical signal.

The apparatus may further includes a cryostat configured to operate at approximately 800 millidegree Kelvin and includes therein a single-pixel amorphous superconducting nanowire single-photon detector (SNSPD) configured to receive the attenuated optical signal via an optical fiber and therefrom produce a corresponding electrical signal, a current bias source configured to supply a bias current to the SNSPD, a passive filter circuit configured to receive the electrical signal from the SNSPD and therefrom produce a filtered electrical signal, and a cryogenic amplifier configured to receive the filtered electrical signal and therefrom produce an amplified electrical signal.

The apparatus may further includes a room-temperature circuit having a room temperature amplifier configured to receive the amplified electrical signal and therefrom produce a low-noise amplified electrical signal, a signal processing circuit configured to receive the low-noise amplified electrical signal having a waveform rising edge of an n-number photon event to produce at least one of a time-differentiated electrical signal by processing the waveform rising edge with a differentiating circuit to generate a differentiated peak corresponding to the n-number photon event, and a time-to-amplitude electrical signal by processing the waveform rising edge with a precision timing circuit to generate a rise time measurement corresponding to the n-number photon event.

The apparatus may further include a processing device configured to determine an integer n-number photon event based on measuring a value of the differentiated peak of the n-number photon event.

The apparatus may further include each optical wave-packet comprising a pulse width of approximately 80 picoseconds at a pulse repetition rate of 300 kHz.

The apparatus may further include the variable optic attenuator controlling a mean photon number per pulse width from the optical source.

The apparatus may further include the passive filter circuit comprising a resistance of 24 ohms and a load of 220 nanohenries and produces the filtered electrical signal having an increased signal-to-noise ratio.

The apparatus may further include the cryogenic amplifier comprising a noise temperature of approximately 4 degrees Kelvin, a bandwidth of approximately 2.5 GHz and a gain of approximately 30-dB.

The apparatus may further include the room temperature amplifier comprising approximately a 3-dB roll-off substantially near 2 GHz.

The apparatus may further include the differentiating circuit comprising a resistance of approximately 50 ohms and a load of approximately 1.5 nanohenries.

The apparatus may further include a waveform display device configured to receive the time-differentiated electrical signal and at least one of display and store the time-differentiated electrical signal, where the processing device receives the stored time-differentiated electrical signal to determine the integer n-number photon event.

Figure 16:
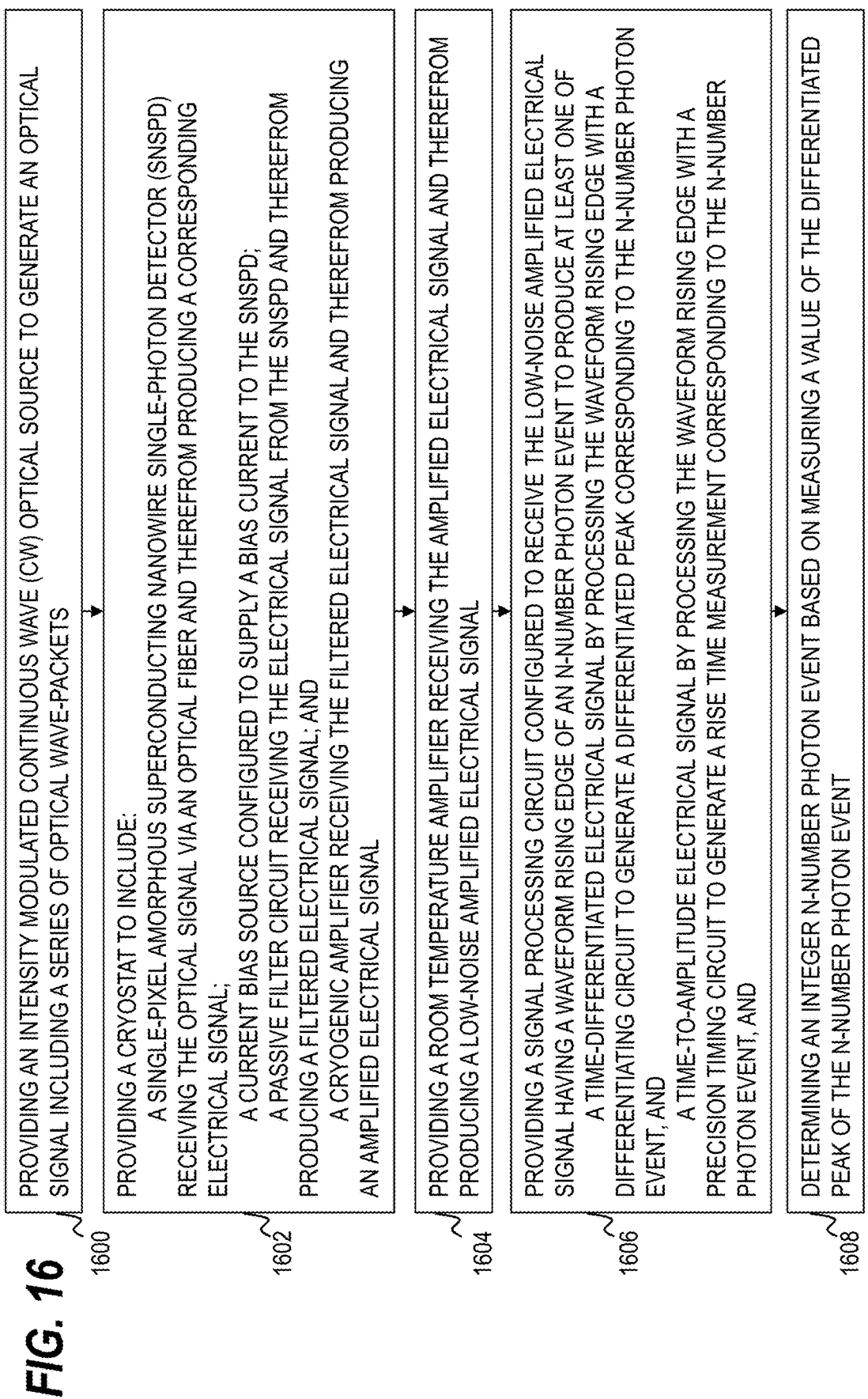
FIG. 16 illustrates a logical flow chart diagram of a method that resolves a discrete number of photons from an optical source multiphoton event.

FIG. 16 illustrates a logical flow chart diagram of a method that resolves a discrete number of photons from an optical source multiphoton event. The method includes providing 1600 an intensity modulated continuous wave (CW) optical source to generate an optical signal includes a series of optical wave-packets. A cryostat is provided 1602 to include: a single-pixel amorphous superconducting nanowire single-photon detector (SNSPD) receiving the optical signal via an optical fiber and therefrom producing a corresponding electrical signal, a current bias source configured to supply a bias current to the SNSPD, a passive filter circuit receiving the electrical signal from the SNSPD and therefrom producing a filtered electrical signal, and a cryogenic amplifier receiving the filtered electrical signal and therefrom producing an amplified electrical signal. A room temperature amplifier is provided 1604 to receive the amplified electrical signal and therefrom producing a low-noise amplified electrical signal.

A differentiating circuit is provided 1606 to receive the low-noise amplified electrical signal having a waveform rising edge of an n-number photon event and producing a time-differentiated electrical signal having a corresponding differentiated peak of the n-number photon event.

A signal processing circuit is provided 1606 to receive the low-noise amplified electrical signal having a waveform rising edge of an n-number photon event to produce either a time-differentiated electrical signal by processing the waveform rising edge with a differentiating circuit to generate a differentiated peak corresponding to the n-number photon event, or a time-to-amplitude electrical signal by processing the waveform rising edge with a precision timing circuit to generate a rise time measurement corresponding to the n-number photon event.

The method further includes determining 1608 an integer n-number photon event based on measuring a value of the differentiated peak of the n-number photon event.

The method further includes providing a variable optic attenuator receiving the optical signal and therefrom producing an attenuated optical signal, wherein the variable optic attenuator controls a mean photon number for each of the series of optical wave-packets.

The method further includes where the provided passive filter circuit comprises a resistance of 24 ohms and a load of 220 nanohenries and receives the electrical signal from the SNSPD and therefrom produces a filtered electrical signal that comprises an increased signal-to-noise ratio.

The method further includes where the provided the cryogenic amplifier comprises a noise temperature of approximately 4-degrees Kelvin, a bandwidth of approximately 2.5 GHz and a gain of approximately 30-dB.

The method further includes where the provided room temperature amplifier comprises approximately a 3-dB roll-off substantially near 2 GHz.

The method further includes where the provided differentiating circuit comprises a resistance of approximately 50 ohms and a load of approximately 1.5 nanohenries.

The method may further include resolving a number of photons in a short optical pulse and may be used in applications where such capability is desired. Most photon detectors feature some level of dark or background photon counts, where an output signal is generated by the SNSPD in the absence of any input photons by the optical source. In most cases, the output signal corresponding to these dark or background counts resemble single photon detection events but very seldom resemble multi-photon detection events. For applications where such dark or background events need to be absolutely suppressed, even at the expense of some single-photon detection signals, the method using the above-described apparatus may only capture the detection events corresponding to two or more photons, thereby eliminating all dark or background photon counts resembling single photon detection events.

A system is disclosed herein to resolve an n-number of photons from an optical source multiphoton event. The system includes an apparatus having an intensity modulated continuous wave (CW) optical source, a variable optic attenuator, a cryostat comprising therein: a single-pixel amorphous superconducting nanowire single-photon detector (SNSPD), a current bias source, a passive filter circuit, and a cryogenic amplifier. The apparatus may further include a room temperature amplifier, a differentiating circuit, and a processing device.

The system may further perform a method of resolving the n-number of photons from the optical source multiphoton event. The method includes generating, by the intensity modulated continuous wave (CW) optical source, an optical signal includes a series of optical wave-packets, attenuating, by the variable optic attenuator, the optical signal to produce an attenuated optical signal, operating the cryostat at approximately 800 millidegree Kelvin, receiving the attenuated optical signal via an optical fiber at the single-pixel amorphous superconducting nanowire single-photon detector (SNSPD) to produce a corresponding electrical signal, supplying, by the current bias source, a bias current to the SNSPD, filtering, by the passive filter circuit, the electrical signal from the SNSPD and produce a filtered electrical signal, amplifying, by the cryogenic amplifier, the filtered electrical signal to produce an amplified electrical signal, further amplifying, by the room temperature amplifier, the amplified electrical signal to produce a low-noise amplified electrical signal.

The system may further produce, by the signal processing circuit, a waveform rising edge of an n-number photon event to produce either a time-differentiated electrical signal by processing the waveform rising edge with a differentiating circuit to generate a differentiated peak corresponding to the n-number photon event, or a time-to-amplitude electrical signal by processing the waveform rising edge with a precision timing circuit to generate a rise time measurement corresponding to the n-number photon event.

The system may further determine, by the processing device, an integer n-number photon event based on measuring a value of the differentiated peak of the n-number photon event.

The system may further include where each optical wave-packet comprises a pulse width of approximately 80 picoseconds at a pulse repetition rate of 300 kHz.

The system may further include where the variable optic attenuator controls a mean photon number per pulse width.

The system may further include where the passive filter circuit includes a resistance of approximately 24 ohms and a load of approximately 220 nanohenries, and the filtered electrical signal comprises an increased signal-to-noise ratio.

The system may further include the cryogenic amplifier having a noise temperature of approximately 4-degrees Kelvin, a bandwidth of approximately 2.5 GHz and a gain of approximately 30-dB.

The system may further include the room temperature amplifier having approximately a 3-dB roll-off substantially near 2 GHz, and the differentiating circuit comprises a resistance of approximately 50 ohms and a load of approximately 1.5 nanohenries.

In summary, when a photon is absorbed in an SNSPD it causes a small section of the superconducting wire to become resistive, often referred to as a hot-spot. The formation of a resistive hot-spot is the mechanism that produces the electrical signal used to signify that a photon detection event has occurred. The electrical waveform of the photon detection event has a sharp rising edge and a slow decay back to zero (usually <1 ns and ≥20 ns, respectively, for amorphous superconducting wires). Additionally, the time-scale or slope of the rising edge is highly dependent on the resistance that develops due to the absorbed photon. When multiple photons are absorbed in different sections of the nanowire, the total resistance is larger than that for a single photon absorption. The larger resistance due to the formation of multiple hot-spots causes the initial rising edge of the detection waveform to be faster or steeper (i.e., shorter in time) and this is how multiphoton detection events are identified. The waveforms are either recorded normally where there is no additional processing done to the signal, or an analog differentiating circuit may be inserted before recording the waveform. The differentiating circuit converts the rise-time of the waveform information to a peak voltage value which may be used to discriminate between absorbed photon-numbers using conventional thresholding techniques.

The foregoing presented embodiments of the apparatus, method and system are illustrative and are not to be construed as limiting thereof. Although a few exemplary embodiments have been described, those skilled in the art will readily appreciate that many modifications are possible in the exemplary embodiments without materially departing from the novel teachings and its advantages. Accordingly, all such modifications are intended to be included within the scope of the provided embodiments as defined in the claims. In the claims, means-plus function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An apparatus operative for resolving the number, n, of photons received during an integer n-number multi-photon event, the apparatus comprising:
  a cryostat comprising a single-pixel superconducting nanowire single-photon detector (SNSPD) configured to receive an optical signal comprising the multi-photon event and therefrom produce an output signal that is based on the optical signal; and
  a signal processing circuit configured to:
    (i) receive a first electrical signal that is based on the output signal, the first electrical signal having a rise time; and
    (ii) determine the value of n based on the rise time.

2. The apparatus according to claim 1, the apparatus further comprising an intensity modulated continuous wave (CW) optical source generating the optical signal such that it includes a series of optical wave-packets.

3. The apparatus according to claim 1 wherein the signal processing circuit is configured to (1) produce a time-differentiated electrical signal having a peak value based on the rise time, (2) determine the peak value of the time-differentiated signal, and (3) determine the value of n based on the peak value.

4. The apparatus according to claim 1, the apparatus further comprising a filter configured to receive the output signal from the SNSPD and therefrom produce the first electrical signal, wherein the filter comprises a resistance and a load inductance and produces the first electrical signal having an increased signal-to-noise ratio.

5. The apparatus according to claim 1, wherein the SNSPD includes a plurality of sections that are physically and electrically connected, each section being operative for forming a localized resistive hot-spot in response to absorption of a different photon of the multi-photon event, and wherein the rise-time is based on the number of resistive hot-spots formed in the SNSPD at the same time.

6. The apparatus according to claim 1, the apparatus further comprising a room temperature amplifier configured to provide the first electrical signal.

7. The apparatus according to claim 3 further comprising a differentiating circuit for providing the time-differentiated electrical signal, wherein the differentiating circuit comprises at least one of:
 a resistance component and an inductive component,
 at least one active component, and
 a combination of resistance, capacitance, inductance, and active components.

8. The apparatus according to claim 1, further comprising:
 a waveform display device configured to (1) generate one of a time-differentiated electrical signal and a time-to-amplitude electrical signal based on the first electrical signal and (2) at least one of display and store one of the time-differentiated electrical signal and the time-to-amplitude electrical signal; and
 an amplitude discriminating device that is configured to receive the stored one of the time-differentiated electrical signal and the time-to-amplitude electrical signal and determine the value of n therefrom.

9. The apparatus according to claim 1, wherein the signal processing circuit includes an amplitude discriminating device for determining the number of photons in the multi-photon event based on at least one of the rise time and an amplitude of the first electrical signal, wherein the amplitude discriminating device comprises at least one of:
 an amplitude-to-digital converter;
 an amplitude-to-time converter; and
 a multi-level discriminator.

10. A method of resolving a discrete number of photons received during an integer n-number multi-photon event, the method comprising:
 receiving an optical signal comprising the multi-photon event at a cryostat that includes:
  (a) a single-pixel superconducting nanowire single-photon detector (SNSPD) configured to receive the optical signal and therefrom produce an output signal that is based on the optical signal; and
  (b) a current bias source configured to supply a bias current to the SNSPD;
 receiving a first electrical signal based on the output signal at a signal processing circuit that is configured to determine a rise time of the first electrical signal, wherein the rise time is based on the number, n, of photons in the multi-photon event; and
 determining the value of n based on the rise time.

11. The method according to claim 10, further comprising providing an intensity modulated continuous wave (CW) optical source to generate the optical signal such that it includes a series of optical wave-packets.

12. The method according to claim 10 wherein the value of n is determined by operations including:
 providing the first electrical signal to a differentiating circuit that generates therefrom a time-differentiated electrical signal having a peak value based on the rise time;
 determining the peak value; and
 determining the value of n based on the peak value.

13. The method according to claim 10 further comprising providing the SNSPD such that it includes a plurality of sections that are physically and electrically connected, each section being operative for forming a localized resistive hot-spot in response to absorption of a different photon of the multi-photon event, and wherein the rise-time is based on the number of resistive hot-spots formed in the SNSPD at the same time.

14. The method according to claim 12 further comprising providing the differentiating circuit such that it includes at least one of:
 a resistance component and an inductive component,
 at least one active component, and
 a combination of resistance, capacitance, inductance, and active components.

15. A system to resolve the number, n, of photons received during an integer n-number multiphoton event, the system comprising:
 a cryostat comprising therein:
  (a) a single-pixel superconducting nanowire single-photon detector (SNSPD) configured to provide an output signal in response to receipt of an optical signal that includes the multi-photon event, wherein the output signal includes a pulse having a rise time that is based on the value of n; and
  (b) a current bias source; and
 a signal processing circuit that is configured to determine the value of n based on the rise time.

16. The system according to claim 15 further comprising:
 an intensity modulated continuous wave (CW) optical source configured to provide the optical signal such that it includes a series of optical wave-packets; and
 a variable optic attenuator configured to attenuate the optical signal to produce an attenuated optical signal.

17. The system according to claim 15 wherein the signal processing circuit is further configured to (1) produce a time-differentiated electrical signal based on the output signal, the time-differentiated electrical signal having a peak value based on the rise time, (2) determine the peak value of the time-differentiated signal, and (3) determine the value of n based on the peak value.

18. The system according to claim 15, wherein the cryostat further comprises a passive filter circuit that is configured to filter the output signal from the SNSPD and produce a filtered electrical signal having an increased signal-to-noise ratio.

19. The system according to claim 17 wherein the signal processing circuit further comprises a differentiating circuit for producing the time-differentiated electrical signal based on the output signal.

20. The system according to claim 15 wherein the signal processing circuit includes an amplitude discriminating device for determining the value of n based on at least one of the rise time and an amplitude of the output signal, wherein the amplitude discriminating device comprises at least one of:
- an amplitude-to-digital converter;
- an amplitude-to-time converter; and
- a multi-level discriminator.

* * * * *